United States Patent
Davenport et al.

(10) Patent No.: US 10,733,161 B1
(45) Date of Patent: Aug. 4, 2020

(54) ATOMICALLY MANAGING DATA OBJECTS AND ASSIGNED ATTRIBUTES

(71) Applicant: EMC IP Holding Company LLC, Hopkinton, MA (US)

(72) Inventors: William C. Davenport, San Diego, CA (US); Himabindu Tummala, South Grafton, MA (US); Vamsi Vankamamidi, Brooklyn, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1117 days.

(21) Appl. No.: 14/984,224

(22) Filed: Dec. 30, 2015

(51) Int. Cl.
*G06F 16/22* (2019.01)
*G06F 16/21* (2019.01)
*G06F 16/23* (2019.01)
*G06F 16/2457* (2019.01)

(52) U.S. Cl.
CPC .......... *G06F 16/22* (2019.01); *G06F 16/219* (2019.01); *G06F 16/2358* (2019.01); *G06F 16/24573* (2019.01)

(58) Field of Classification Search
None
See application file for complete search history.

(56) References Cited

U.S. PATENT DOCUMENTS

| 7,769,722 | B1 | 8/2010 | Bergant et al. |
| 8,930,311 | B1* | 1/2015 | Wang ..................... G06F 3/0619 707/628 |
| 9,460,008 | B1* | 10/2016 | Leshinsky ........... G06F 12/0238 |
| 9,881,014 | B1 | 1/2018 | Bono et al. |
| 2007/0185973 | A1 | 8/2007 | Wayda et al. |
| 2013/0290648 | A1* | 10/2013 | Shao ....................... G06F 12/04 711/154 |
| 2017/0277715 | A1* | 9/2017 | Strauss ............... G06F 16/1865 |

* cited by examiner

*Primary Examiner* — Amresh Singh
(74) *Attorney, Agent, or Firm* — BainwoodHuang (57) ABSTRACT

A technique for managing data storage places a data object in a first logical extent within a logical address space of a storage system and places a set of attributes assigned to that data object in a second logical extent within the same logical address space of the storage system. In response to a request to generate a second version of the data object, such as a snap, clone, or replica, for example, the first and second logical extents are duplicated atomically, thereby preserving a second version of the attributes along with the second version of the data object.

15 Claims, 7 Drawing Sheets

ATOMICALLY MANAGING DATA OBJECTS AND ASSIGNED ATTRIBUTES

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored in the non-volatile storage devices.

Data storage systems commonly organize data in the form of data objects, such as LUNs (Logical UNits), file systems, and/or virtual machine volumes (e.g., VVOLs, as available from VMware, Inc. of Palo Alto, Calif.). The data objects are accessible to host computers connecting to the data storage systems and/or by host applications running locally on the data storage systems. Data storage systems commonly support data services for data objects, such as the ability to generate snapshots (i.e., point-in-time versions of data objects, also referred to herein as "snaps") and clones (full copies of data objects), as well as the ability to perform replication. As is known, replication involves synchronously or asynchronously creating a unique copy of a data object, either locally or at a remote location.

Data storage systems often allow host applications and/or other software constructs to assign attributes to data objects. Such attributes may assist the host applications and/or software constructs in using the data objects. A data storage system may store attributes of data objects locally, e.g., in a persistent database within the data storage system.

SUMMARY

Unfortunately, the practice of storing attributes of data objects in a persistent database can place burdens on software developers and can impair the functionality of data storage systems. For example, snapshot, clone, and replication services each create new versions of data objects. Developers must therefore take special care to ensure that associations between such new versions of the data objects and their respective attributes are not disrupted, such that host applications and/or other software constructs can continue to benefit from their use in connection with the new versions. Maintaining these associations may be complex, however, as data storage systems generally store data objects in one area, which is accessed using one set of protocols, and store attributes of data objects in another area (e.g., the database), which is accessed using a completely different set of protocols. Thus, for example, to generate a snap of a data object, it is necessary both to generate the new object and separately to copy its attributes, leading to increased complexity. Not only does this arrangement present complexities in software development, but also during runtime operations. For example, during replication of a data object, the object itself may successfully be replicated but the object's attributes may not. Thus, real-time activities may need to pause and retry to obtain the attributes, causing the data storage system to operate inefficiently.

In contrast with the prior approach, in which object attributes are stored in a separate database, an improved technique for managing data storage places a data object in a first logical extent within a logical address space of a storage system and places a set of attributes assigned to that data object in a second logical extent within the same logical address space of the storage system. In response to a request to generate a second version of the data object, such as a snap, clone, or replica, for example, the first and second logical extents are duplicated atomically, thereby preserving a second version of the attributes along with the second version of the data object.

In some examples, the second logical extent is disposed within a region of the first logical extent, such that a command to create a new version of the first logical extent effects new versions of both the data object and its attributes. In other examples, the first and second logical extents are distinct but operations for creating new versions of logical extents are provided, which treat the first logical extent and the second logical extent as one, thereby atomically creating a new version of the data object along with its attributes.

Advantageously, the data object and its attributes are stored together in the same location (i.e., within the same logical address space or even within the same logical extent), such that a common set of operations may be performed on both at the same time and using the same set of protocols. Thus, the above-described complexities in software management are avoided, as are the inefficiencies in the operation of the storage system.

Certain embodiments are directed to a method of managing data storage. The method includes placing a data object in a first logical extent within a logical address space of a storage system, the first logical extent being a contiguous range of logical addresses that has a starting offset and a length. The method further includes placing a set of attributes of the data object in a second logical extent within the logical address space of the storage system. The set of attributes includes information applied to the data object by one or more software constructs that have access to the data object. Data of the first and second logical extents are stored in a set of persistent storage devices. In response to a request to generate a second version of the data object, the method still further includes atomically duplicating the first logical extent together with the second logical extent, thereby preserving a second version of the attributes of the data object together with the second version of the data object.

Other embodiments are directed to a computer program product. The computer program product includes a set of non-transitory, computer-readable media having instructions which, when executed by control circuitry, cause the control circuitry to perform a method of managing data storage. The method includes placing a data object in a first logical extent within a logical address space of a storage system, the first logical extent being a contiguous range of logical addresses that has a starting offset and a length, and placing a set of attributes of the data object in a second logical extent within the first logical extent. The set of attributes include information applied to the data object by one or more software constructs that have access to the data object. Data of the first logical extent, which includes the data of the second logical extent, are stored in a set of persistent storage devices. The method further includes, in response to a request to generate a second version of the data object, duplicating the first logical extent, thereby preserving a second version of the attributes of the data object together with the second version of the data object.

Still further embodiments are directed to a data storage system constructed and arranged to perform a method of managing data storage, such as either method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to be limiting.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing data storage places a data object in a first logical extent within a logical address space of a storage system and places a set of attributes assigned to that data object in a second logical extent within the same logical address space of the storage system. In response to a request to generate a second version of the data object, such as a snap, clone, or replica, for example, the first and second logical extents are duplicated atomically, thereby preserving a second version of the attributes along with the second version of the data object.

Figure 1:
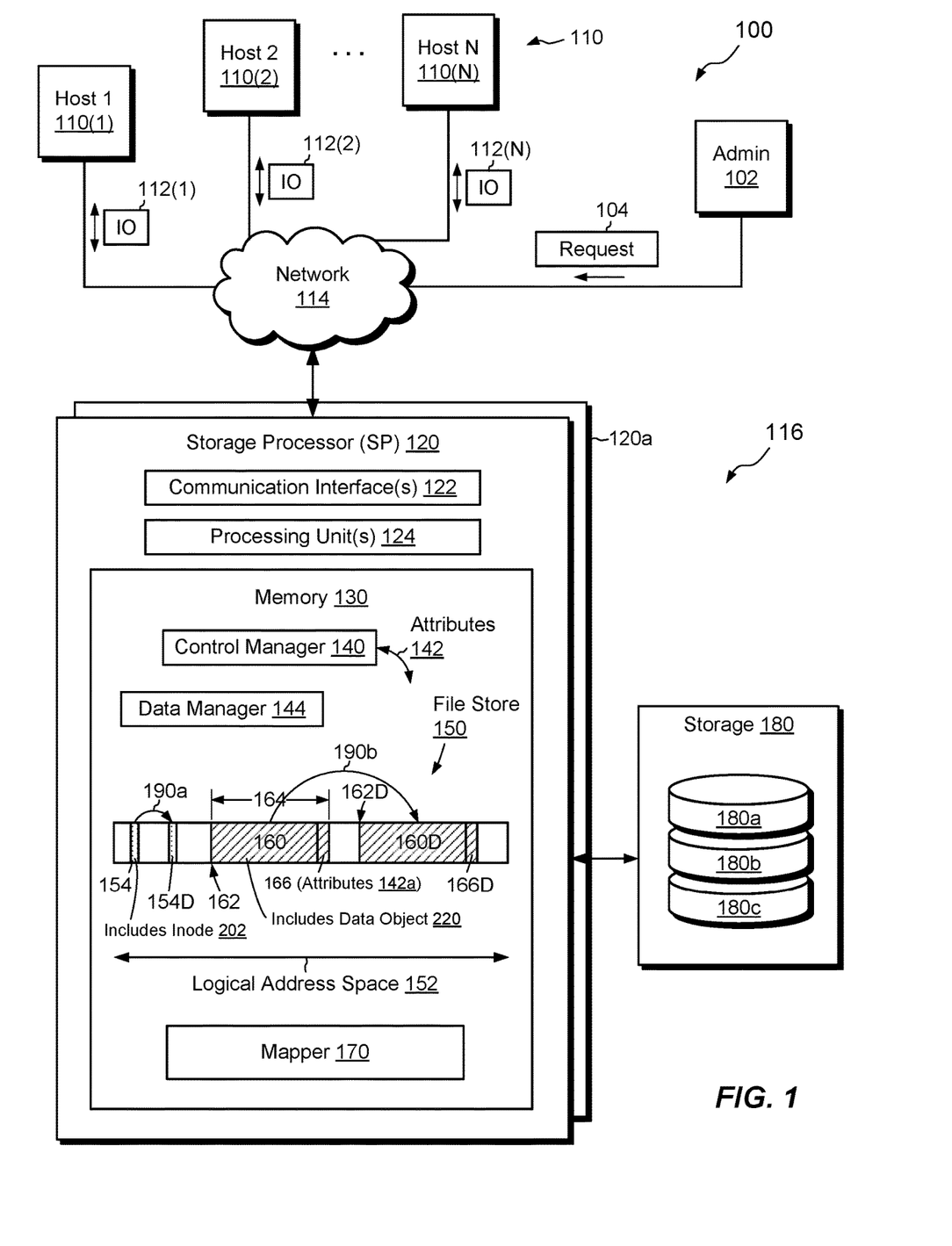
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180, such as magnetic disk drives, electronic flash drives, and/or other persistent storage devices. Three storage drives 180a, 180b, and 180c are specifically shown, but the storage 180 may include any number of storage drives. Such drives may be arranged in any suitable way, such as in RAID groups (RAID is an acronym for Redundant Array of Independent—or Inexpensive—Disks). The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs. In a particular alternative example, the functionality of SP 120 may provided as one or more virtual machines running on a hypervisor, such as ESX available from VMware, Inc.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 may be configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips, cores, and/or assemblies, as well as associated co-processors and chipsets. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes, i.e., realizes by operation of executable code, control manager 140, data manager 144, file store 150, and mapper 170. The control manager 140 includes software structures that control operations in the data storage system 116. These operations may include accessing data objects from the file store 150, assigning attributes 142 to the data objects, and retrieving attributes 142a from the file store 150, e.g., to assist the control manager 140 in its use of the data objects. The attributes 142 provide information about the data objects, such as their names, types, access protocols, and so forth. In some examples, hosts 110 may also assign attributes 142 to data objects and may retrieve the attributes 142 when performing operations on the data objects. The data manager 144 manages data operations in the file store 150 and in the mapper 170.

The file store 150 is a logical structure that arranges logical data and metadata of files. In some examples, the files arranged by the file store 150 may be container files, i.e., files that realize entire data objects, such as LUNs, file systems, and VVols, including all of their data and metadata. Thus, for example, the file store 150 may arrange data and metadata of a file, which itself arranges data and metadata of a data object. The file store 150 may arrange data and metadata of any number of data objects, as well as snaps, clones, and replicated versions of those data objects.

The file store 150 has a logical address space 152, in which individual logical units are arranged by logical address. The logical address space 152 provides a contiguous range of such logical addresses, which extends, for example, from zero to a very large number (e.g., exabytes). Data objects within the file store 150 may be provided within logical extents (i.e., ranges of contiguous logical addresses) within the address space 152. Metadata describing such data objects (e.g., inodes, directories, etc.) may also be arranged in logical extents in the address space 152.

In the example shown, a first logical extent 160 arranges data of a data object 220. The first logical extent 160 has a starting logical address 162 and a length 164. In this example, the length 164 exceeds the length of the data object 220 itself, and the space not occupied by the data object 220 includes a second logical extent 166. The second logical extent 166 arranges data of the attributes 142a of the data object 220. Thus, both the data object 220 and the attributes 142a of the data object 220 are arranged together within the first logical extent 160. As will be described, this co-location of the data object 220 with its attributes 142a promotes convenient and atomic duplication of the data object 220 along with its attributes 142a.

As further shown in FIG. 1, the file store 150 includes a third logical extent 154. The third logical extent 154 arranges data of an inode 202 of the container file that contains the data object 220. As known to those skilled in file system design, an inode, or "index node," is a per-file data structures that stores information about a file, such as its owner and size, as well as direct pointers to data of the file and/or indirect pointers to other data structures that point to data of the file. Inodes generally do not store file names, which are usually stored in directories instead. Here, the inode 202 may include pointers to logical addresses within the logical address space 152 where data of the data object 220 are stored. Thus, for example, the pointers in inode 202 may point to the first logical extent 160. The file store 150 may also arrange data of directories and other structures, although such directories and other structures are omitted from the figure for the sake of simplicity.

Continuing with reference to FIG. 1, the mapper 170 performs mapping of logical addresses within the logical address space 152 of the file store 150 to corresponding physical locations in the storage 180. Thus, for example, the mapper 170 associates each allocated address within the logical address space 152 with a respective location in storage 180. It should be understood, however, that the mapper 170 may operate in an entirely thin manner, i.e., to allocate physical storage only as needed to support allocated logical addresses in the file store 150. Thus, while the logical address space 152 may be very large (e.g., exabytes), only a small fraction of that logical address space 152 is typically backed by physical storage 180. In some examples, the mapper 170 is further configured to manage physical block sharing, e.g., to support snapshots, logical copies, and deduplication.

With the arrangement shown, the data manager 144 can copy or move logical extents (e.g., 160 or 166) from one location to another within the logical address space 152. For example, the data manager 144 includes a set of primitives that accept inputs describing a source and a target. The source may be specified, for example, as a logical offset (logical address within space 152) and a length (number of logical address units) of a source logical extent. The target may be specified, for example, as a logical offset. Assuming sufficient space is available, the primitives receiving these inputs may copy or move (as specified by the request) the source to the target. In some examples, the primitives accept, as a description of the source, multiple source extents at respective locations. The primitives may likewise accept, as a description of the target, multiple target locations, e.g., one for each source extent. Such primitives may therefore perform logical copies not only of single logical extents, but also of multiple logical extents, all together as one and atomically.

It should be appreciated that logical copies (or moves) of logical extents need not be accompanied by physical copies or moves. Rather, the separation of logical space, as tracked by the file store 150, from physical storage, as tracked by the mapper 170, effectively decouples logical operations from physical ones. Thus, for example, the data manager 144 may direct the file store 150 to make a logical copy of a storage extent and may separately direct the mapper 170 either to map the new logical copy to the same storage that backs the source (e.g., by block sharing) or to map the new logical copy to newly allocated, separate storage.

In example operation, the hosts 110(1-N) issue IO requests 112(1-N) to the data storage system 116. The SP 120 receives the IO requests 112(1-N) at the communication interfaces 122 and initiates further processing. Such processing may include reading and/or writing the data object 220 arranged within the file store 150. In the course of such activity, or at some other time, the control manager 140 and/or hosts 110 assign attributes 142a to the data object, and the data manager 144 places the attributes 142a in the second logical extent 166, i.e., within the space provided for the first logical extent 160 but not used by the data object 220.

At some point, an administrator operating admin device 102 may issue a request 104 to generate a second version of the data object 220. For example, the administrator may request a snap or clone of the data object 220. In some examples, the request 104 may be issued automatically, e.g., by the admin device 102 or by the data storage system 116 itself, e.g., in response to a predetermined schedule or other event.

In response to the request 104, the data manager 144 may proceed by (1) allocating a new logical extent 154D for arranging a new inode for the snap, clone, or replicated version (arrow 190a), and (2) allocating a new logical extent 160D for arranging a logical duplicate of the data object 220 (arrow 190b). These acts may be performed in any order. The data manager 144 may further copy the data backing the inode 202 and adjust the copy to point to the new logical extent 160D. Additional activities then may depend on the specific operation requested. For example, to generate a snap, the data manager 144 directs the mapper 170 to map the new logical extent 160D to the same physical storage to which the first logical extent 160 is already mapped, i.e., with no copies being made of underlying data. To generate a clone, a snap may be created, as described above, with write splits then induced to effect copying of the underlying data to new locations in storage 180.

In either of these cases, the data manager 144 responds to the request 104 by issuing an atomic operation that duplicates the data object 220 along with its attributes 142a to the new logical extent 160D. For example, the data manager 144 may operate the above-described primitives to copy the data that backs logical extent 160 (at offset 162 and length 164) into the logical extent 160D (offset 162D and length 164). The resulting logical copy thus encompasses both the data object 220 and the attributes 142a, which are logically copied as one to the new location 162D.

Using this technique, any number of snaps or clones of the data object 220 may be created, with each such snap or clone providing not only a version of the data object 220, but also a corresponding version of the attributes 142a. In addition, the corresponding version of the attributes 142a provided in any such snap or clone is a point-in-time version, which corresponds to the same point in time reflected in the snap or clone. Thus, the technique herein not only preserves the attributes 142a of the data object 220 atomically with the data object itself when creating snaps or clones, but it also preserves the versions of the those attributes 142a at the same points in time at which the snaps or clones were created.

Figure 2:
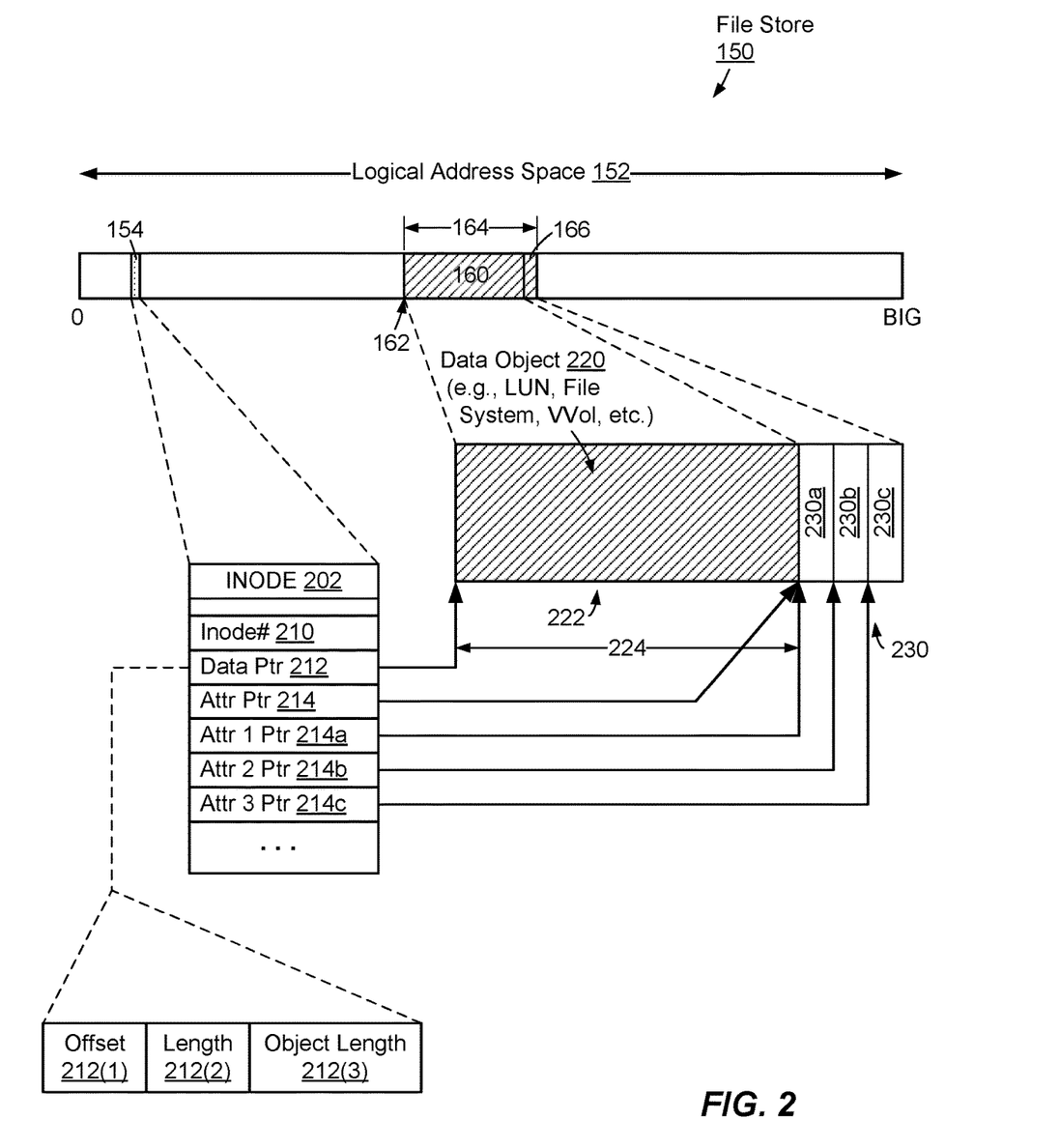
FIG. 2 is a block diagram of example structures of a file store of FIG. 1.

FIG. 2 shows example features of the file store 150 in additional detail, e.g., prior to creation of any duplicate version of data object 220. Here, the first logical extent 160 is seen to include a first region 222, which arranges the data object 220, and a second region 230, which arranges the attributes 142a. In the illustrated example, the second region 230 coincides with the second logical extent 166. It should be understood that the data object 220 need not completely fill the first region 222, nor must the attributes 142a completely fill the second region 230, i.e., there may be free space. The first region 222 is seen to have a length 224. In addition, the second region 230 may include sub-regions, shown by example as sub-regions 230a, 230b, and 230c. In the example shown, each sub-region, of which there may be any number, arranges a respective one of the attributes 142a, e.g., one sub-region per attribute. It should be understood, however, that there is no requirement for different attributes 142a to be provided in respective sub-regions. For instance, in some examples, attributes 142a may be placed altogether within region 230, e.g., in a data structure, such as a b-tree.

FIG. 2 further shows the inode 202 in additional detail. Here, the inode 202, which is provided for the container file that realizes the data object 220, includes multiple fields. These fields provide, for example, an inode number 210, a data pointer 212, and an attribute pointer 214. In an example, the inode number 210 uniquely identifies the container file that realizes the data object 220 within a namespace of the file store 150.

The data pointer 212 points to the logical container file data within the file store 150. In an example, the data pointer 212 itself has three sub-fields, i.e., an offset 212(1), a length 212(2), and an object length 212(3). Here, the offset 212(1) points to the same location as offset 162, i.e., where the first logical extent 160 begins, and the length 212(2) corresponds to the length 164 of the first logical extent 160. The object length 212(3) provides the length of the data object 220 (shown here as length 224), i.e., the size of the container file realizing the data object 220, as denominated in logical address units.

The attribute pointer 214 points to the beginning of the second region 230, while the attribute sub-pointers 214a, 214b, and 214c point, respectively, to attribute sub-regions 230a, 230b, and 230c. In some examples, each of these pointers 214, 214a, 214b, and 214c may include the same sub-fields as those described above for the data pointer 212. It should be appreciated, however, that sub-pointers 214a, 214b, and 214c may be omitted in cases where a single data structure, such as a b-tree, is used to organize attributes 142a within region 230.

The illustrated arrangement thus permits convenient access, through the inode 202, both to the container file realizing the data object 220 and to the attributes 142a and, in the example shown, to each of the attributes 142a, individually. The illustrated arrangement thus shows that the file store 150 not only co-locates the data object 220 with its attributes 142a in the same logical extent 160, which promotes atomic duplication by action of primitives, but also it organizes access to the attributes in the same structure that organizes access to the container file—i.e., in the inode 202.

Figure 3:
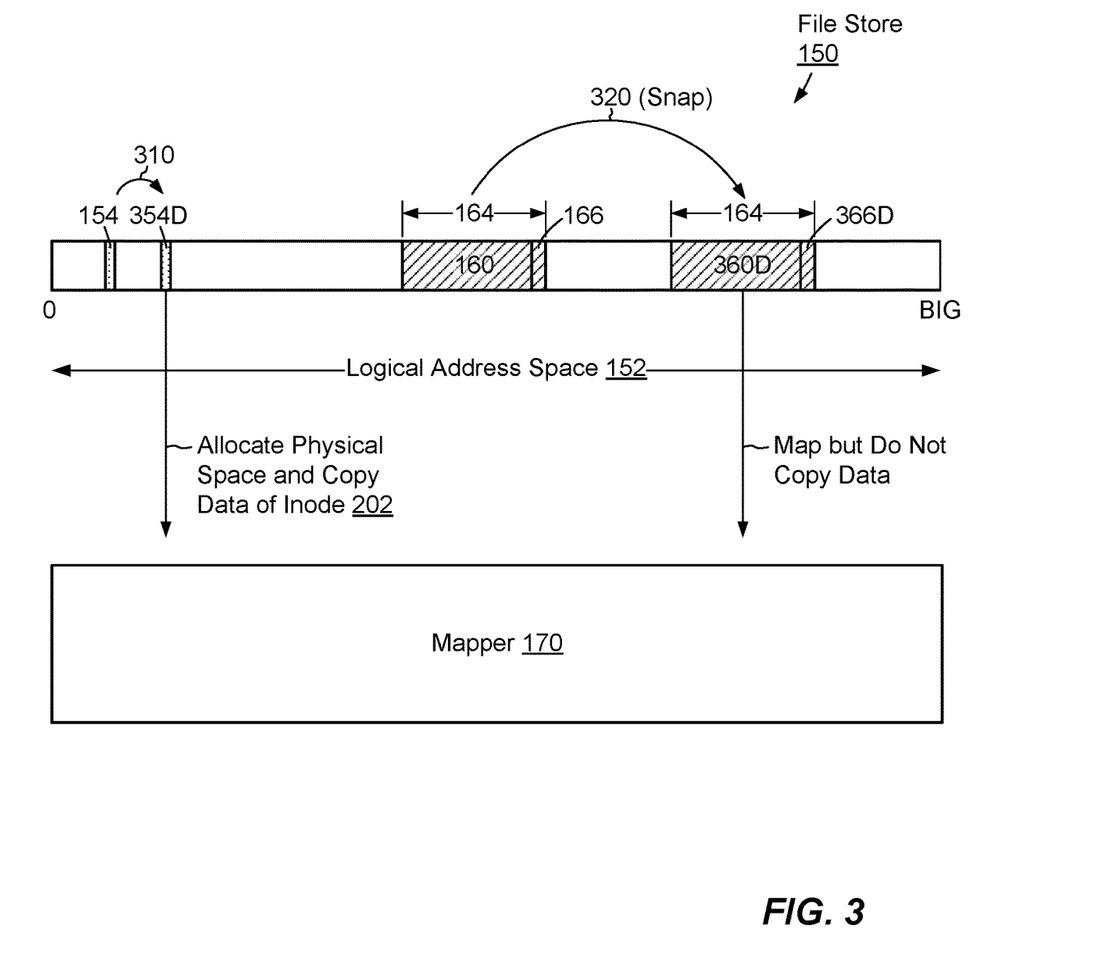
FIG. 3 is a block diagram of an example arrangement for generating a snap of a data object together with its assigned attributes.

FIG. 3 shows an example arrangement for generating a snap of a data object, where the snap preserves a version of the attributes assigned to the data object along with a version of the data object itself. As previously described, a snap is a point-in-time version of a data object, which has a separate logical identity from the original data object (e.g., a separate inode and logical extent) but initially shares the same physical storage with the data object.

To create a snap of data object 220, e.g., in response to a request 104, the data manager 144 (FIG. 1) may direct the following activities:

Allocate (310) a new extent 354D for a new inode for the snap;

Allocate (320) a new extent 360D the same size (164) as that of the original extent 160;

Format the new inode, e.g., by copying fields from the original inode 202 and setting fields in the new inode that are different, such as by pointing to the extent 360D;

Directing the mapper 170 to logically copy the backed data from the source extent 160 into the new extent 360D, e.g., by manipulating an indirect block tree or other structure to share the underlying storage blocks.

These acts may be performed in any suitable order. It should be understood that the above-described technique for generating a snap is merely one example, and that the invention hereof is not limited to any particular snap techniques.

As the first logical extent 160, which arranges the data object 220, encompasses the second logical extent 166, which arranges the attributes 142a, the above-described act of logically copying the first logical extent 160 directly effects copying of the second logical extent 166, of which it is a part. In an example, the above described logical copying is performed by operating the above-described primitives.

As the new version created in this example is a snap, no physical copying of data backing the first logical extent 160 is performed. Rather, the mapper 170 points the logical addresses in the newly allocated extent 360D to the same locations in storage 180 to which the logical addresses in logical extent 160 already point. Thus, the original data locations backing logical extent 160 are shared rather than copied.

Figure 4:
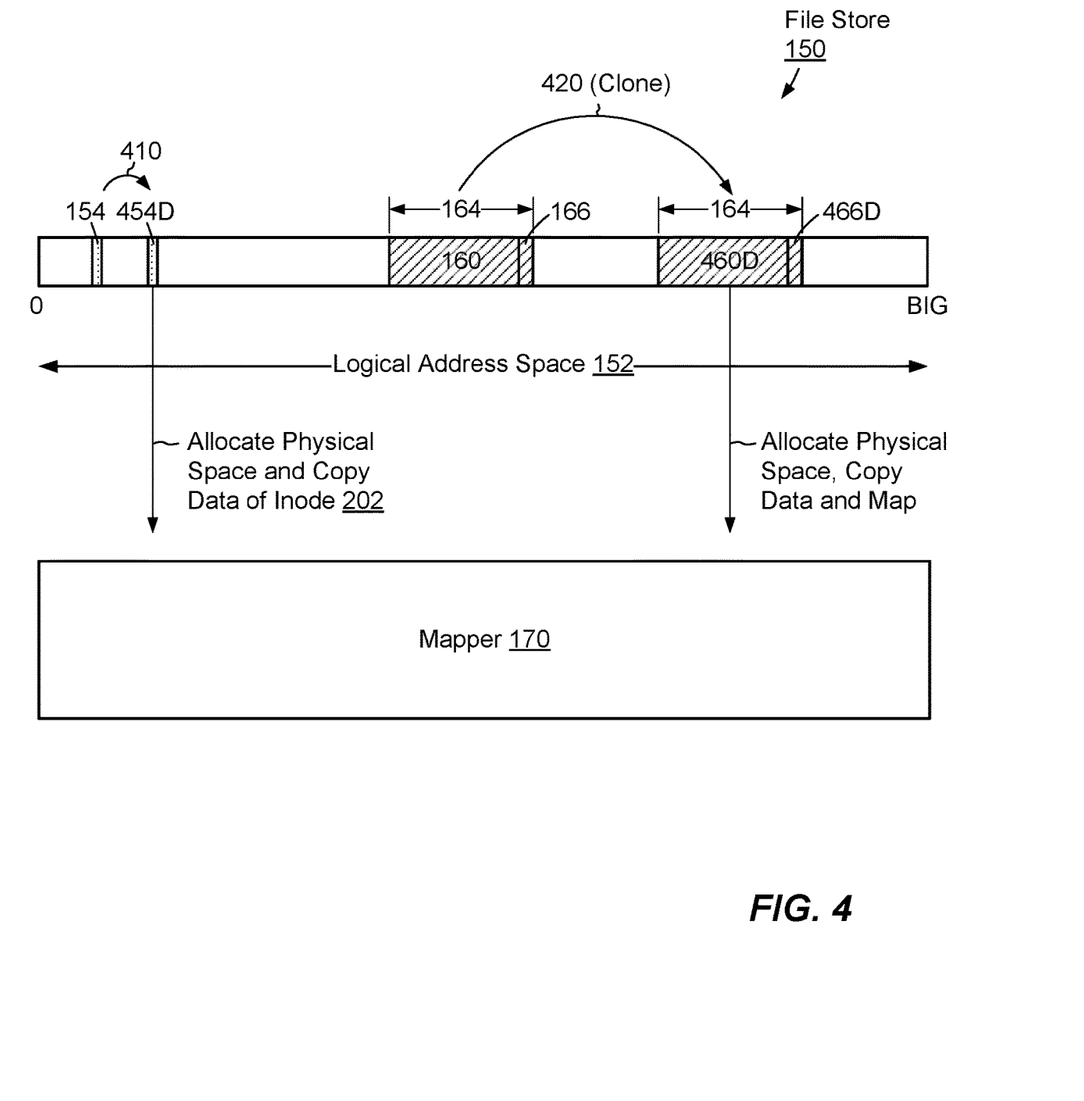
FIG. 4 is a block diagram of an example arrangement for generating a clone of the data object together with its assigned attributes.

FIG. 4 shows an example arrangement for generating a clone of a data object, where the clone preserves a version of the attributes assigned to the data object along with a version of the data object itself. In contrast with a snap, a clone is both a logical copy and a physical copy.

To generate a clone of data object 220, e.g., in response to a request 104, the data manager 144 (FIG. 1) may, first, generate a new snap of the data object 220 and, second, generate a duplicate copy of the snap's data. Creating the new snap may proceed in the manner described above, e.g., by allocating (410) a new inode extent 454D, allocating (420) a new data extent 460D, formatting the new inode, and directing the mapper 170 to establish block sharing with the original data in extent 160. Once the new snap is created, a copy of the shared data is made to new locations in storage 180, e.g., by reading the snap's data and writing to induce write splits and storage of the snap's data in the new locations.

As the first logical extent 160, which arranges the data object 220, encompasses the second logical extent 166, which arranges the attributes 142a, the above-described act of cloning the data object 220 effects an atomic copying of both the data object 220 and its attributes 142a.

Figure 5:
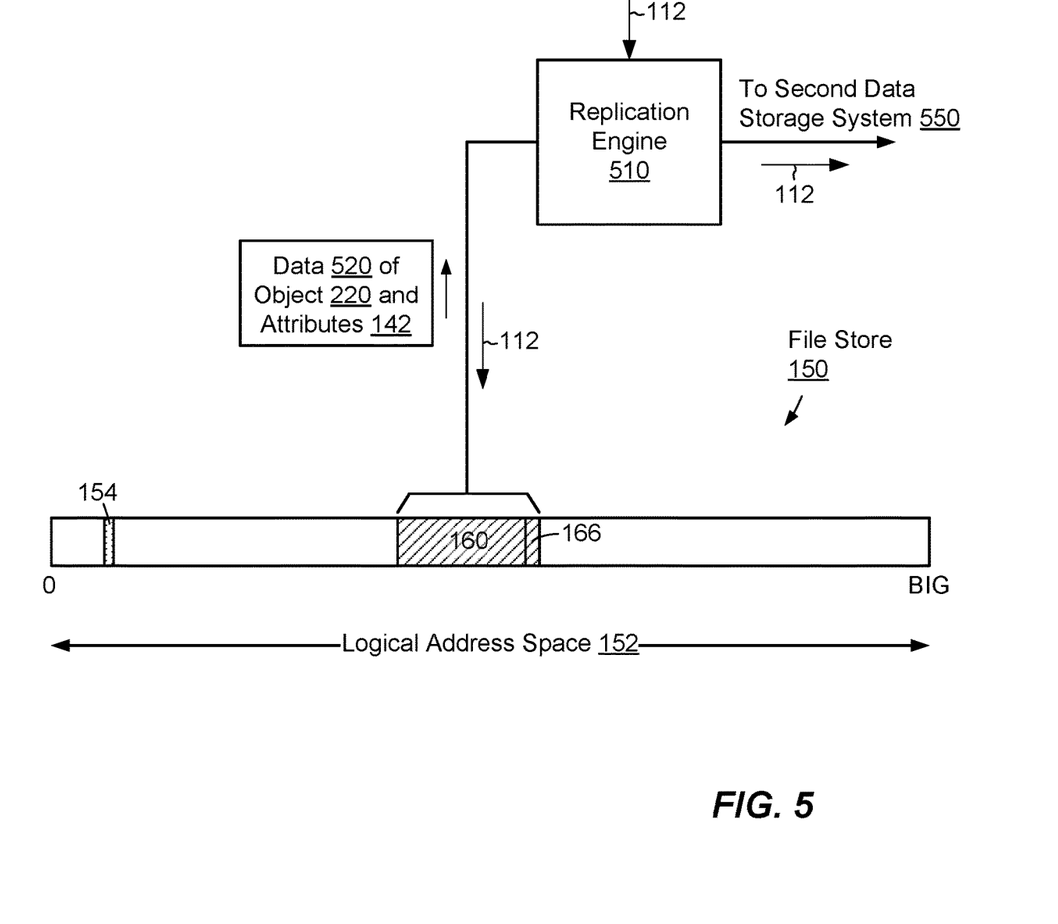
FIG. 5 is a block diagram of an example arrangement for replicating the data object together with its assigned attributes.

FIG. 5 shows an example arrangement for replicating the data object 220, where the replication preserves a version of the attributes assigned to the data object along with a version of the data object itself. In an example, a replication engine 510 performs synchronous replication and/or asynchronous replication on the first logical extent 160.

Synchronous replication operates inline with IO requests 112 that specify writes to the first logical extent 160 to create a replica in a second data storage system 550, e.g., one IO request 112 at a time. For example, the replication engine 510 inspects IO requests 112 directed to the file store 150 and identifies each such IO request 112 that specifies a write to the first logical extent 160. Such IO requests 112 may be directed to the data object 220, to the attributes 142a, or to both. For each such IO request 112, the replication engine 510 writes the specified data both to the specified location in the first logical extent 160 and to a corresponding location in the second data storage system 550. By mirroring IO requests 112 across the entire first logical extent 160, which includes the second logical extent 166, the replication engine 510 maintains a replica at the second data storage system 550 that includes both the data object 220 and its attributes 142a. Thus, a replica of the attributes 142a is preserved at the second data storage system 550 along with a replica of the data object 220.

Asynchronous replication operates out of band with IO requests 112, e.g., on a periodic basis. In an example, to perform asynchronous replication the replication engine 510 initially takes an initial snap of the logical extent 160 and ships the snap to the second data storage system 550, which stores a copy of the logical extent 160 and uses it as a baseline. Subsequently, the replication engine 510 creates a new snap at each replication event, e.g., with each snap created using the arrangement described in connection with FIG. 3. The replication engine 510 ships the difference between each new snap and the preceding snap to the second data storage system 550, which applies the difference to the version maintained thereon. This process of taking snaps, computing differences, and sending the differences to the second data storage system 550 may continue indefinitely, as required, to periodically refresh the version at the second data storage system 550 and thereby keep it up to date.

As asynchronous replication operates by taking snaps of the entire first logical extent 160, which includes the second logical extent 166, the snaps track not only changes in the data object 220, but also changes in its attributes 142a. Thus, a version of the attributes 142a is preserved at the second data storage system 550 along with a version of the data object 220.

It should be appreciated that replication may also be performed locally, i.e., entirely within the data storage system 116. For example, the replication engine 510 may be configured to replicate the first logical extent 160 from a first range within the data store 150 to a second range within the same data store 150. Such internal replication may thus serve as an additional manner of creating new versions of the data object 220 and its attributes 142a locally.

Figure 6:
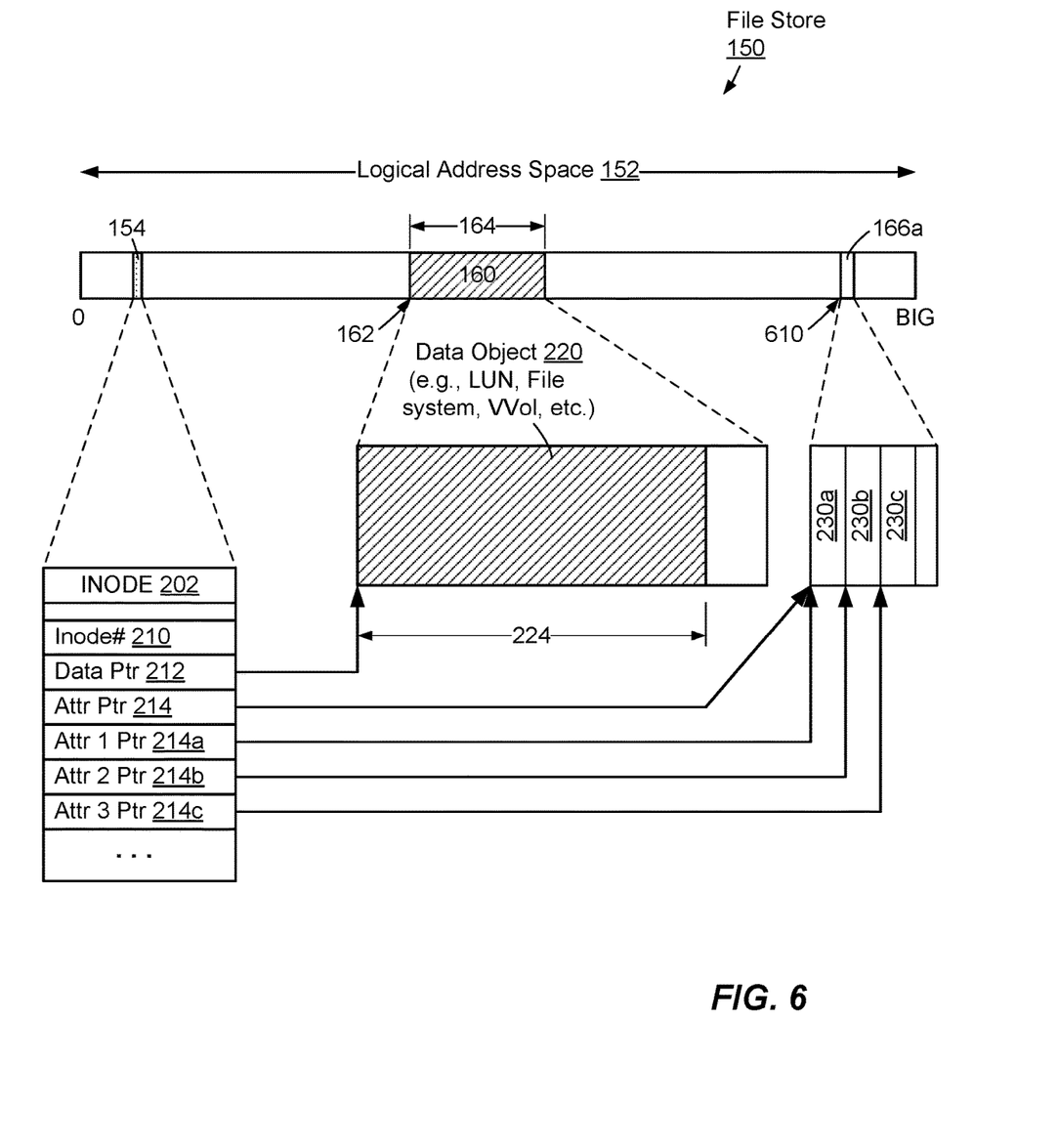
FIG. 6 is a block diagram of an alternative arrangement of example structures of the file store of FIG. 1.

FIG. 6 shows an alternative arrangement of the file store 150. Here, a separate logical extent 166a, which arranges the attributes 142a, is distinct from the first logical extent 160, which arranges the data object 220. Thus, rather than being encompassed within the first logical address range of the first logical extent 160, the logical extent 166a occupies a range of logical addresses outside the first logical extent 160. In this arrangement, the attribute pointer 214 in inode 202 is adjusted to point to a starting address 610 of the logical extent 166a. If provided, sub-pointers 214a, 214b, and 214c are adjusted accordingly.

It should be appreciated that the arrangement of FIG. 6 preserves the above-described atomic duplication of a data object together with its attributes, as described in connection with FIGS. 1-5. For example, the above-described primitives for making logical copies of logical extents may provide, as already described, and option for specifying multiple logical extents as a source and multiple respective logical extents as a target. Therefore, the above-described arrangements for creating snaps (FIG. 3) and clones (FIG. 4) may be performed with the arrangement of FIG. 6, in which the logical extent 166a arranging the attributes 142a is distinct from the logical extent 160 arranging the data object 220 that corresponds to those attributes 142a. Further, as asynchronous replication (FIG. 5) operates based on snaps, such asynchronous replication is also available with the arrangement of FIG. 6 and confers the same advantages. For performing synchronous replication (also FIG. 5), similar results can be obtained in the arrangement of FIG. 6, e.g., by configuring the replication engine 510 to detect and mirror IO requests 112 directed to both the logical extent 160 and to the logical extent 166a.

Figure 7:
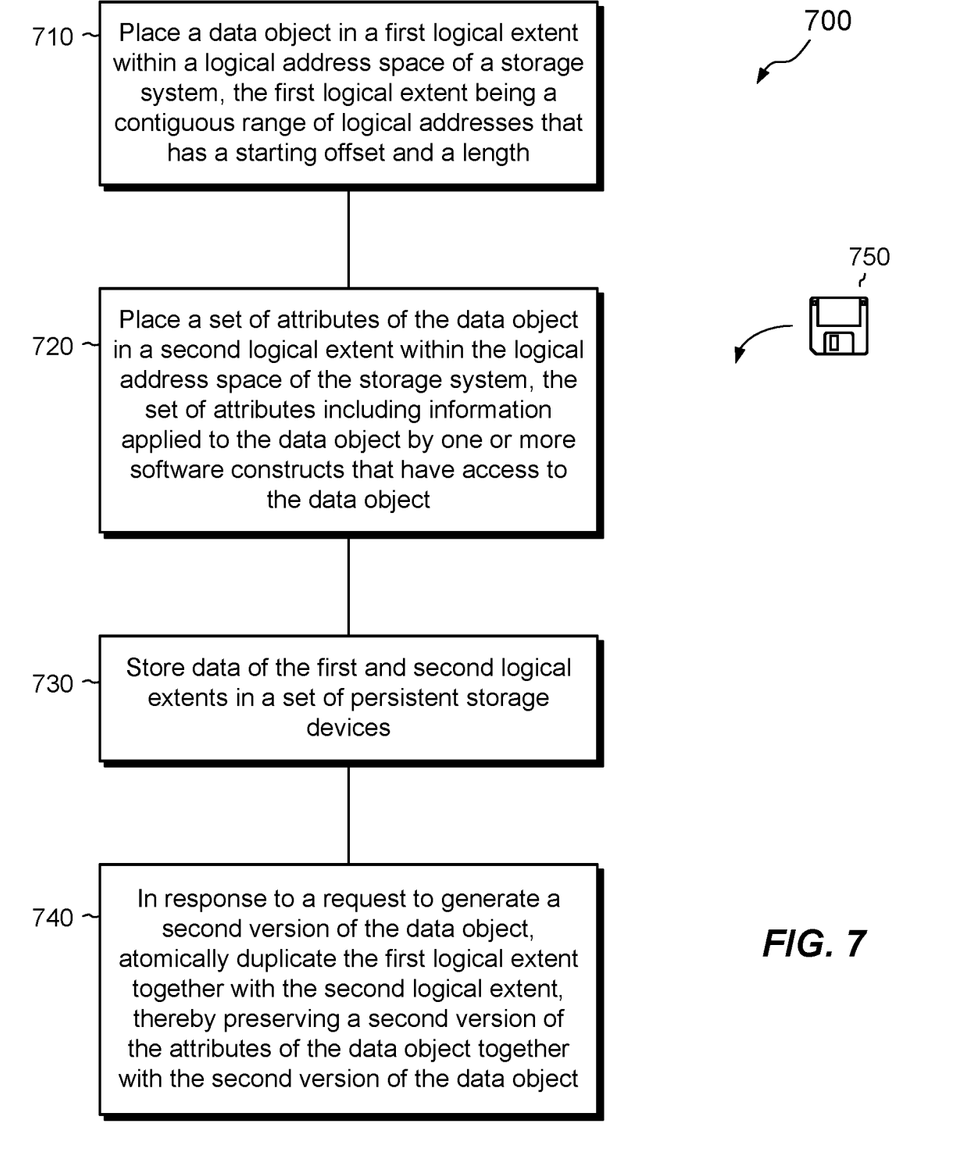
FIG. 7 is a flowchart of an example method of managing data storage.

FIG. 7 shows an example process 700 for managing data storage. The process 700 may be carried out, for example, in connection with the environment 100, e.g., by the software constructs described in connection with FIG. 1 which reside in the memory 130 of the SP 120 and are run by the set of processing units 124. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At 710, a data object is placed in a first logical extent within a logical address space of a storage system, the first logical extent being a contiguous range of logical addresses that has a starting offset and a length. For example, a data object 220, such as a LUN, file system, VVOL, or the like, is placed in logical extent 160 within the logical address space 152 of the file store 150 in the data storage system 116. The logical extent 160 covers a range of logical addresses that has a starting address 162 and a length 164.

At 720, a set of attributes of the data object is placed in a second logical extent within the logical address space of the storage system, the set of attributes including information applied to the data object by one or more software constructs that have access to the data object. For example, attributes 142a of data object 220 are placed in logical extent 166 (FIG. 2) or 166a (FIG. 6). The attributes 142a include information applied by control manager 140 and/or hosts 110 that access the data object.

At 730, data of the first and second logical extents are stored in a set of persistent storage devices. For example, data of extents 160 and 166 (or 166a) are stored in magnetic disk drives, solid state drives, and the like, in storage 180 (FIG. 1).

At 740, in response to a request to generate a second version of the data object, the first logical extent is atomically duplicated together with the second logical extent, thereby preserving a second version of the attributes of the data object together with the second version of the data object. For example, in response to a request 104 (FIG. 1), the logical extent 160 is atomically duplicated along with the logical extent 166 (or 166a), thus preserving a second version of the attributes 142a with the data object 220, e.g., based on snapping (FIG. 3), cloning (FIG. 4), or replication (FIG. 5).

An improved technique has been described for managing data storage. The technique places a data object 220 in a first logical extent 160 within a logical address space 152 of a storage system 116 and places a set of attributes 142a assigned to that data object 220 in a second logical extent 166 or 166a within the same logical address space 152 of the storage system 116. In response to a request to generate a second version of the data object 220, such as a snap, clone, or replica, the first and second logical extents 160 and 166 or 166a are duplicated atomically, thereby preserving a second version of the attributes along with the second version of the data object.

Having described certain embodiments, numerous alternative embodiments or variations can be made. For example, as shown and described, attributes 142a for data object 220 are stored within a single logical extent 166 (or 166a). This is merely an example, however. Alternatively, different attributes 142a may be stored in different logical extents at different locations in the file store 150. For creating snaps and clones, the logical extents of such attributes 142a may be aggregated and joined with the logical extent for data object 220, e.g., using the above-described primitives that perform atomic logical copying of multiple source extents to multiple respective target extents. To perform synchronous replication, the replication engine 510 may be configured to recognize and mirror IO requests 112 directed to the logical extents of such attributes 142a together with the logical extent of the data object 220. Thus, while examples have been described herein for atomically duplicating two logical extents, it should be appreciated that the invention hereof may involve atomically duplicating any number of logical extents.

Further, it should be appreciated that the embodiments disclosed herein may also operate in computing environments that integrate host application processing within a storage processor or other computing node that performs similar storage operations. In some examples, a computing node may combine storage functionality, application processing, networking, and security together in a so-called hyper-converged arrangement. Many such nodes may work together, e.g., in a hyper-converged infrastructure, which shares storage 180 and/or provides additional storage accessible to multiple computing nodes.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data storage, the method comprising:
   placing a data object in a first logical extent within a logical address space of a storage system, the first logical extent being a contiguous range of logical addresses that has a starting offset and a length;
   placing a set of attributes of the data object in a second logical extent within the logical address space of the storage system, the set of attributes including information applied to the data object by one or more software constructs that have access to the data object, the logical address space providing a contiguous range of logical addresses within which the first logical extent and the second logical extent are disposed at respective logical addresses;
   storing data of the first and second logical extents in a set of persistent storage devices; and
   in response to a request to generate a second version of the data object, atomically duplicating the first logical extent together with the second logical extent, thereby preserving a second version of the attributes of the data object together with the second version of the data object, wherein the data object is associated with an inode that provides information about the data object, and wherein atomically duplicating the first logical extent together with the second logical extent includes creating a snapshot, the snapshot providing a unique copy of the inode but not a unique copy of the data of the first logical extent nor a unique copy of the second logical extent, the snapshot providing a point-in-time version of the data object and of the set of attributes and remaining stable even as the data object and the set of attributes change over time.

2. The method of claim 1, wherein the data object is one of (i) a LUN (Logical UNit), a file system, and a virtual machine volume.

3. The method of claim 2, further comprising placing the inode in a third logical extent within the logical address space of the storage system, the inode including a set of pointers to locations of the first logical extent and the second logical extent within the logical address space of the storage system.

4. The method of claim 3, wherein the set of attributes includes multiple attributes, and wherein the inode includes a respective pointer to each of the multiple attributes.

5. The method of claim 4, wherein the first logical extent includes a first region that contains the data object and a second region that contains additional space, and wherein the second logical extent is disposed within the additional space contained in the second region of the first logical extent.

6. The method of claim 3, further comprising:
in response to a request to generate a third version of the data object, atomically duplicating both the first logical extent and the second logical extent, thereby preserving the attributes of the data object with the third version of the data object,
wherein generating the third version of the data object includes generating a unique copy of the inode, generating a unique copy of the data of the first logical extent, and generating a unique copy of the data of the second logical extent.

7. The method of claim 3, further comprising:
in response to a request to generate a fourth version of the data object, atomically duplicating both the first logical extent and the second logical extent, thereby preserving the attributes of the data object with the fourth version of the data object,
wherein the set of persistent storage devices are disposed within a first storage system, and wherein generating the fourth version of the data object includes copying the data of the first logical extent and the data of the second logical extent to a second storage system.

8. A computer program product including a set of non-transitory, computer-readable media having instructions which, when executed by control circuitry, cause the control circuitry to perform a method of managing data storage, the method comprising:
placing a data object in a first logical extent within a logical address space of a storage system, the first logical extent being a contiguous range of logical addresses that has a starting offset and a length;
placing a set of attributes of the data object in a second logical extent within the first logical extent, the set of attributes including information applied to the data object by one or more software constructs that have access to the data object, the logical address space providing a contiguous range of logical addresses within which the first logical extent and the second logical extent are disposed at respective logical addresses;
storing data of the first logical extent, which includes data of the second logical extent, in a set of persistent storage devices; and
in response to a request to generate a second version of the data object, duplicating the first logical extent, thereby preserving a second version of the attributes of the data object together with the second version of the data object,
wherein the method further comprises placing an inode in a third logical extent within the logical address space of the storage system, the inode providing information about the data object and including a set of pointers to locations of the first logical extent and the second logical extent within the logical address space of the storage system, and
wherein duplicating the first logical extent includes creating a snapshot, the snapshot providing a unique copy of the inode but not a unique copy of the data of the first logical extent, the snapshot providing a point-in-time version of the data object and of the set of attributes and remaining stable even as the data object and the set of attributes change over time.

9. The computer program product of claim 8, wherein the data object is one of (i) a LUN (Logical UNit), a file system, and a virtual machine volume.

10. The computer program product of claim 8, wherein the set of attributes includes multiple attributes, and wherein the inode includes a respective pointer to each of the multiple attributes.

11. The computer program product of claim 8, wherein the method further comprises:
in response to a request to generate a third version of the data object, duplicating the first logical extent, thereby preserving the attributes of the data object with the third version of the data object,
wherein duplicating the first logical extent includes generating a unique copy of the inode and generating a unique copy of the data of the first logical extent.

12. The computer program product of claim 8, wherein the method further comprises:
in response to a request to generate a fourth version of the data object, duplicating the first logical extent, thereby preserving the attributes of the data object with the fourth version of the data object,
wherein duplicating the first logical extent includes copying the data of the first logical extent to a second storage system.

13. A data storage system, comprising:
a set of persistent storage devices; and
control circuitry, coupled to the set of persistent storage devices, the control circuitry constructed and arranged to:
place a data object in a first logical extent within a logical address space of a storage system, the first logical extent being a contiguous range of logical addresses that has a starting offset and a length;
place a set of attributes of the data object in a second logical extent within first logical extent, the set of attributes including information applied to the data object by one or more software constructs that have access to the data object, the logical address space providing a contiguous range of logical addresses within which the first logical extent and the second logical extent are disposed at respective logical addresses;

store data of the first logical extent, which includes data of the second logical extent, in a set of persistent storage devices; and in response to a request to generate a second version of the data object, duplicate the first logical extent, thereby preserving a second version of the attributes of the data object together with the second version of the data object, wherein the control circuitry is further constructed and arranged to place an inode in a third logical extent within the logical address space of the storage system, the inode providing information about the data object and including a set of pointers to locations of the first logical extent and the second logical extent within the logical address space of the storage system, and wherein, the control circuitry, constructed and arranged to generate the second version of the data object, is further constructed and arranged to generate a snapshot, the snapshot providing a unique copy of the inode but not a unique copy of the data of the first logical extent, the snapshot providing a point-in-time version of the data object and of the set of attributes and remaining stable even as the data object and the set of attributes change over time.

14. The data storage system of claim 13, wherein the data object is one of (i) a LUN (Logical UNit), a file system, and a virtual machine volume.

15. The data storage system of claim 13, wherein the control circuitry is further constructed and arranged to:
  in response to a request to generate another version of the data object, duplicate the first logical extent, thereby preserving the attributes of the data object with the other version of the data object,
  wherein duplicating the first logical extent includes copying the data of the first logical extent to a second data storage system.

* * * * *